United States Patent Office 2,727,917
Patented Dec. 20, 1955

2,727,917
METHOD OF PREPARING ORGANO-SUBSTITUTED STANNANE DERIVATIVES

Gerry P. Mack, Jackson Heights, and Emery Parker, New York, N. Y., assignors to Advance Solvents & Chemical Corporation, a corporation of New York No Drawing. Application August 5, 1950,
Serial No. 177,968

24 Claims. (Cl. 260—429)

The invention relates to a new method of preparing organo-tin compounds in which all four valences of tetravalent tin are bound to organic radicals.

Heretobefore, the standard method for obtaining such compounds has consisted in using organo-tin halides as starting material and in reacting the organo-tin halides with the alkali-metal derivatives of the organic compounds which shall be bound to the tin atom. The reaction proceeds under formation of alkali halide which has to be filtered off.

This known method gives in some cases good yields and pure end products, but the necessity of filtering the reaction products makes it economically unattractive, and it has serious inherent drawbacks. The preparation of the alkali-metal derivatives of the organic compounds requires frequently the use of sodium metal, sodium amide or sodium hydride, which makes the process expensive and hazardous. The main difficulty, however, is that in many cases the organo-tin halides enter into side reactions and form by-products and complex compounds which cannot be separated by simple manipulations from the desired end product.

The object of the invention is to provide a generic method of preparing organo-tin compounds of the character described which avoids the use of halides and does not necessitate any filtration or complicated purification of the end products.

Another object of the invention is to provide new and useful organic tin compounds.

Other objects and advantages will be apparent from a consideration of the specification and claims.

We have found that organic compounds containing an active hydrogen, i. e. a hydrogen which is replaceable by alkali metal, may be readily bound to the $R_2Sn=$ or $R_3Sn-$ radical when they are reacted with an organo-tin methoxide, for instance with a dialkyl or diaryl tin dimethoxide or a trialkyl or triaryl tin monomethoxide.

The organo-tin derivatives of these compounds are obtained in almost theoretical yield, and the end products are, after distillation of the formed methanol, free of any by-products.

The reaction is represented by the following equations:

(1) $R_2Sn(OCH_3)_2 + 2HR' \rightarrow R_2Sn(R')_2 + 2CH_3OH$
(2) $R_3SnOCH_3 + HR' \rightarrow R_3SnR' + CH_3OH$ where R stands for a monovalent hydrocarbon radical and R' is the residue of the organic compound containing the active hydrogen.

Certain organic compounds having an active hydrogen seem, in view of their particular configuration, not to be able to replace both methoxy groups of organo-tin dimethoxides, but replace only one of them. In this case, the reaction may proceed according to the equation:

(1a)
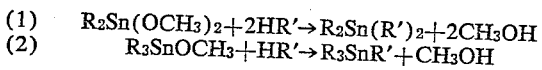

Compounds reacting in this manner are, e. g. compounds where the atom bearing the active hydrogen is linked to bulky aromatic nuclei or to unsaturated aliphatic carbon to carbon linkages.

Compounds having an active hydrogen, which readily react with organo-tin methoxides, are, for instance, the following:

(a) Compounds in which active hydrogen is bound to an oxygen atom. Such compounds are:

Aliphatic saturated and unsaturated alcohols, cyclic alcohols, aromatic alcohols, such as allyl, butyl, hexyl, 2-ethylhexyl, nonyl, lauryl, oleyl, stearyl, furfuryl, tetrahydrofurfuryl, dicyclopentenyl, cinnamyl, phenylethyl, benzyl alcohol, and others.

Ether alcohols, for instance alkoxy and aryloxy glycols and polyglycols.

Acetals and ketals of trihydric alcohols having one free OH group, such as glycerol acetal and the like.

Esters of hydroxyacetic acids, such as ethyl hydroxy isobutyrate, butyl lactate, tributyl citrate, ethyl ricinoleate.

Aldehyde and keto alcohols such as glycolic aldehyde, aldol, hydroxyacetone, acetoin, diacetone alcohol, and others.

Phenols and derivatives as phenol carboxylic acid esters and phenol ethers, e. g. tert. butyl phenol, octyl phenol, nonyl phenol, methyl salicylate, butyl para hydroxy benzoate, hydroquinone monoethylether, and the like.

Saturated and unsaturated aliphatic, cyclic and aromatic monocarboxylic acids such as for example the fatty acids, acrylic, crotonic, sorbic, furoic, furylacrylic, fencholic, benzoic, cinnamic and other acids as well as substituted acids, such as aldehyde acids, e. g. glyoxylic or pyromucic acid; amino acids, e. g. glycine, alanine, leucine, and others. Partial esters of di and polycarboxylic acids having one free carboxylic group.

Aliphatic and aromatic dicarboxylic acids, e. g., oxalic, malonic, succinic, adipic, sebacic, maleic, fumaric, itaconic, phthalic, terephthalic and similar acids, react, depending on the ratio of reactants used and the reaction conditions, as follows:

(3) $R_2Sn(OR')_2 + R''(COOH)_2 \longrightarrow$
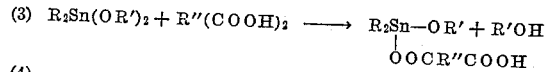

(4) $2R_2Sn(OR')_2 + R''(COOH)_2 \longrightarrow$
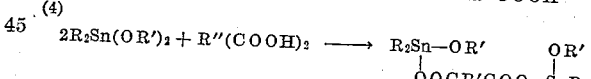

If reaction (3) is carried out at higher temperatures or over prolonged periods of time, a second molecule of alcohol is split off and compounds of the formula

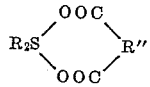

are formed.

In the reactions (3) and (4) we may replace the dicarboxylic acids by their anhydrides when traces of a compound containing free hydroxyl groups are present as a catalyzer. Such compounds are water, also in the form of moisture, or preferably the free alcohol which forms the alkoxide groups of the organo-tin dialkoxide brought to reaction. The organo-tin dialkoxides contain in most cases already a sufficient amount of the alcohol from their preparation. Under these circumstances, the reaction between an organo-tin dialkoxide containing traces of the alcohol and the anhydride proceeds well according to the equation (5) $R_2Sn(OR')_2 + R''(CO)_2O \longrightarrow$
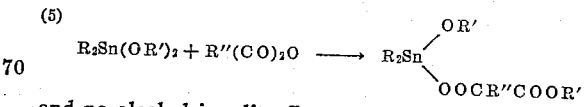

and no alcohol is split off.

The compounds obtained by reacting organo-tin dialkoxides with carboxylic acids or anhydrides are identical to the ether-esters described in the copending application No. 151,524, of Gerry P. Mack and Ferdinand B. Savarese, filed March 3, 1950.

(b) Compounds in which active hydrogen is bound to sulphur, such as mercaptanes, e. g. lauryl mercaptane, ethyl thioglycolate, thioglycol 2-ethyl hexoic acid ester, and others.

(c) Compounds in which active hydrogen is bound to nitrogen. Such compounds are, for instance:

Amides and imides, e. g. phthalimide, succinimide, ureides such as barbituric acid; sulfonamides and sulfonimides.

Aldoximes and ketoximes, such as butyraldoxime, cyclohexanone oxime, and others.

(d) Compounds in which active hydrogen is bound to carbon. A principal group of this class are compounds containing active methylene groups, such as malonic esters, amides and nitriles; beta-keto esters and amides; 1.3 diketones; disulfones and sulphone ketones; compounds containing three negative groups of which at least two are adjacent to the methylene group; and compounds having a methylene group between a conjugated double bond system and a negative group, such as for example esters of phenyl acetic acid, phenyl acetonitrile, phenylacetone, etc.

Another group of compounds belonging to this class are hydrocarbons having a conjugated double bond system, such as indene, cyclopentadiene, and others.

Dialkyl or diaryl methoxide may be also reacted with a mixture of two of the above cited compounds according to the equation:

(6) $R_2Sn(OCH_3)_2 + HR' + HR^2 \rightarrow R_2SnR'R^2 + 2CH_3OH$ wherein $R'$ and $R^2$ designate residues of different radicals as defined above.

The organo-tin methoxide used for the reaction is best obtained by causing an organo-tin halide to react under anhydrous conditions with at least the stoichiometric amount of alkali methoxide, preferably at a temperature below the boiling point of the methanol solution, removing the formed precipitate and distilling off the unreacted methanol in the presence of a completely dry inert gas. The preparation of monomeric organo-tin dimethoxide in this manner is the subject matter of our copending application, Serial No. 173,478, filed July 12, 1950.

The reaction between the organo-tin methoxide and the compound containing active hydrogen is carried out at a temperature sufficient to distill off methanol and under anhydrous conditions by using carefully dried equipment and by preventing the access of moist air to the reaction vessel. We prefer to bubble through the reaction mixture, during the reaction, dry nitrogen, which also facilitates the removal of the methanol set free during the reaction.

The following examples, which, it is to be understood, are not to be considered as limiting the invention in any manner, are given to illustrate the method of the invention by the preparation of some organo-tin derivatives of active hydrogen containing compounds which are representative members of the various subgroups listed above.

*Example 1*

29.5 g. (0.1 mol) of dibutyl tin dimethoxide and 37.3 g. (0.2 mol) of lauryl alcohol were heated together at 90° C. while introducing dry nitrogen gas into the mixture. The heating was continued for 1½ hours until the distillation of the methanol formed during the reaction was completed. 6.4 g. of methanol were recovered by condensation.

The remaining liquid product obtained in the theoretical yield was dibutyl tin dilauroxide of the formula $(C_4H_9)_2Sn(OH_{23}C_{12})_2$ having at 20° C. a specific gravity of 1.025 and a refractive index of 1.4730.

*Example 2*

32.2 g. (0.1 mol) of tributyl tin methoxide and 18.6 g. (0.1 mol) of lauryl alcohol were heated in the same way as described in the preceding example until the removal of the methanol was completed.

Liquid tributyl tin monolaurate was obtained in almost theoretical yield.

*Example 3*

29.5 g. (0.1 mol) of dibutyl tin dimethoxide and 41.2 g. (0.2 mol) of butoxytriethylene glycol were reacted as described in the preceding examples until dibutyl tin dibutoxy-triethylene glycoxide was obtained as the oily reaction product.

*Example 4*

29.5 g. (0.1 mol) of dibutyl tin dimethoxide and 23.6 g. (0.2 mol) of glycerine acetal were heated under stirring and under nitrogen gas. Methanol started to distill over at 80° C. and the temperature was slightly raised until the removal of methanol was completed. A liquid product of the formula

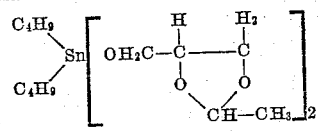

was obtained in 100% yield.

*Example 5*

32 g. (0.1 mol) of tributyl tin monomethoxide and 11.6 g. (0.1 mol) of diacetone alcohol were heated under dry nitrogen, and the methanol was driven off and condensed. The temperature was raised to 135° C. to complete the removal of the methanol.

The remaining liquid reaction product was essentially a compound of the formula

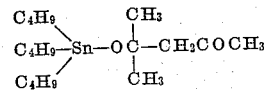

*Example 6*

29.5 g. (0.1 mol) of dibutyl tin dimethoxide and 30.4 g. (0.2 mol) of methyl salicylate were reacted as described in Example 1. Dibutyl tin di(orthocarboxymethyl phenoxide) of the formula

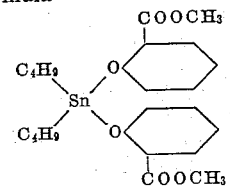

was obtained as a soft solid reaction product.

*Example 7*

17.4 g. (0.2 mol) of butyraldoxime and 29.5 g. (0.1 mol) of dibutyl tin dimethoxide were mixed and gradually heated to 110°–120° C. until 0.2 mol. of methanol were driven off and condensed. The liquid reaction product had at 20° C. a specific gravity of 1.2120 and a refractive index of 1.4998. According to its analysis, it was believed to correspond to a compound of the formula

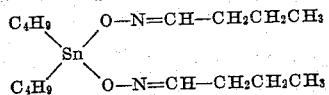

or to an isomeric derivative of the isooxime

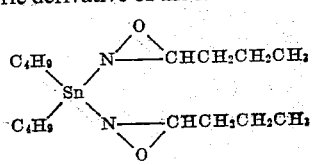

Example 8

40.5 g. (0.2 mol) of lauryl mercaptane and 29.5 g. (0.1 mol) of dibutyl tin dimethoxide were heated at 130°–140° C. under nitrogen gas until the theoretical amount of methanol was recovered and further heating under vacuum did not yield any volatile matter.

A clear colorless liquid dibutyl tin di(dodecylmercaptide) was obtained in theoretical yield. It had at 20° C. a specific gravity of 1.045 and a refractive index of 1.5177.

Example 9

29.5 g. (0.1 mol) of dibutyl tin dimethoxide and 19.8 g. (0.2 mol) of succinimide were treated under nitrogen and the methanol which distilled over was condensed. The temperature was gradually raised to 145° C. and maintained until the distillation of the methanol ceased. On applying vacuum no more methanol was driven off and the recovered amount of methanol corresponded very closely to the theoretical amount.

The solid waxy reaction product was completely soluble in toluene and corresponded to the formula

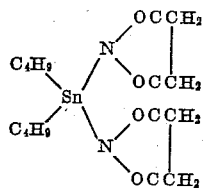

Example 10

29.5 g. (0.1 mol) of dibutyl tin dimethoxide and 21.4 g. (0.1 mol) of N-butyl benzene sulfonamide were heated under nitrogen at 130°–140° C. until 3.2 g. (0.1 mol) of methanol had been distilled over.

The remaining liquid reaction product had the formula

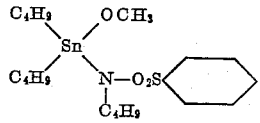

Example 11

43.3 g. (0.2 mol) of dibutyl malonate and 29.5 g. (0.1 mol) of dibutyl tin dimethoxide were heated under nitrogen at 140° C. for 90 min. in the presence of 0.05 g. of sodium methoxide, added as a catalyst. The methanol which distilled over was weighed and corresponded closely to the theoretical amount of 0.2 mol.

The obtained colorless liquid was predominantly a compound of the formula

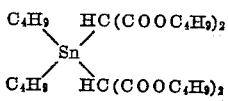

having at 20° C. a specific gravity of 1.133 and a refractive index of 1.4650.

Example 12

38.44 g. of ethyl benzoylacetate (0.2 mol) and 29.5 g. (0.1 mol) of dibutyl tin methoxide were heated under exactly the same conditions as described in Example 11.

The obtained liquid product had the formula

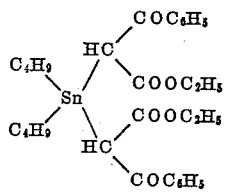

and at 20° C. a specific gravity of 1.255 and a refractive index of 1.5757.

Example 13

19.8 g. (0.2 mol) of methyl cyano-acetate and 29.5 g. (0.1 mol) of dibutyl tin dimethoxide were heated under nitrogen. Methanol started distilling over at 85° C., and the temperature was gradually raised to 130° C. until the distillation of methanol had stopped.

The reaction product was a viscous liquid of the formula

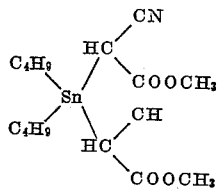

Example 14

When mixing 20.0 g. (0.2 mol) of 2.4-pentanedione and 29.5 g. (0.1 mol) of dibutyl tin dimethoxide, an exothermic reaction was observed whereby the temperature rose to 50°–60° C. and methanol started distilling over. Upon heating the mixture under a stream of dry nitrogen gas at 110° C. for one hour, the reaction was completed.

A slightly yellowish oily product was obtained which was essentially dibutyl di(acetylacetonyl) tin of the formula

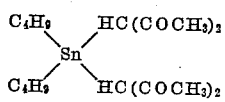

(theoretic Sn content 27.47%; found 27.3%).

It had at 20° C. a specific gravity of 1.2120 and a refractive index of 1.4998.

Example 15

Tributyl acetylacetonyl tin of the formula

(C₄H₉)₃SnCH(COCH₃)₂ was obtained as an oil by heating 32.2 g. (0.1 mol) of tributyl tin methoxide and 10 g. (0.1 mol) of 2.4-pentanedione under dry nitrogen at 135° C. until all volatile matter had been removed. The condensed liquid corresponded very closely to 0.1 mol of methanol.

Example 16

42.6 g. (0.2 mol) of diacetyl benzoyl methane were added under stirring in a nitrogen atmosphere to 29.5 g. (0.1 mol) of dibutyl tin dimethoxide. The temperature of the mixture rose slowly to 80°–85° C., and methanol distilled over. The reaction was completed by heating at 120° C. until all methanol was distilled over. After all volatile matter had been removed by vacuum distillation, a reddish liquid product was obtained which corresponded to the formula

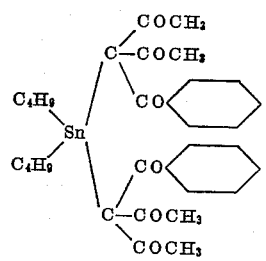

(Theoretic Sn content 18.03%; found 18.02%).

It had at 20° C. a specific gravity of 1.257 and a refractive index of 1.5859.

Example 17

23.2 (0.2 mol) of indene and 29.5 g. (0.1 mol) of dibutyl tin dimethoxide were heated under nitrogen and the split off methanol was distilled over. The distillation started at 85° C.; the heating was continued for 1¾ hours in order to remove substantially the theoretical amount of methanol. The liquid remaining end product corresponded largely to a compound of the formula

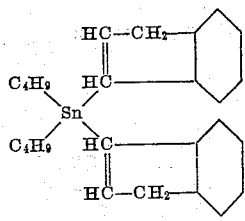

When only 11.6 g. (0.1 mol) of indene were brought to reaction under similar conditions, dibutyl methoxy indenyl tin was obtained of the formula

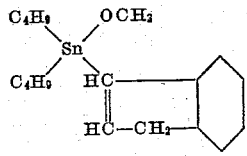

Example 18

29.5 g. (0.1 mol) of dibutyl tin dimethoxide and 25.8 g. (0.1 mol) of 2-ethyl hexyl ester of phenylacetic acid $$C_6H_5CH_2COOH_2CCH(C_2H_5)C_4H_9$$

were heated under nitrogen. 0.1 mol of methanol were distilled over and condensed. The end product corresponded to the formula

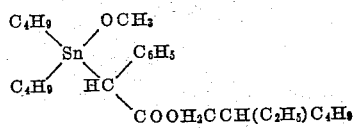

Example 19

11.2 g. (0.1 mol) of sorbic acid were added to 29.5 g. (0.1 mol) of dibutyl tin dimethoxide and the mixture was heated under a stream of dry nitrogen to 80–90° C. to distill off the methanol. Then vacuum was applied and all volatile matter was eliminated under reduced pressure.

The remaining solid was dibutyl tin methoxide sorbate of the formula

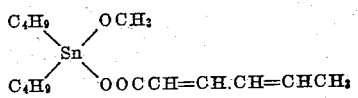

The tin content was 31.6% (calculated 31.65%).

Example 20

19.6 g. (0.2 mol) of maleic anhydride were added to 59 g. (0.2 mol) of dibutyl tin dimethoxide containing traces of free methanol and the mixture was warmed up until the maleic anhydride melted. The heating was continued under stirring until an exothermic reaction started whereupon the temperature rose rapidly to 80–90° C. On further heating to 120-130° C., no methanol distilled out and no loss in weight occurred when the mixture was subjected to a vacuum of 20 mm. at temperatures of 80–90° C.

The obtained highly viscous reaction product was a compound of the formula

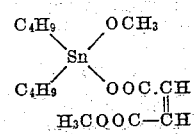

At 20° C., its refractive index was 1.5102 and its specific gravity 1.3742. The tin content was found to be 30.42% (calculated 30.21%).

Example 21

23.9 g. (0.1 mol) of diethyl tin dimethoxide and 29.2 g. (0.2 mol) of butyl lactate were mixed and heated slowly under a stream of dry nitrogen. Methanol started to distill over at 80° C., which indicated the beginning of the reaction. The temperature was slowly raised to 130° C. until no more methanol was driven off. The total amount of condensed methanol was 6.1 g.

The liquid reaction product was heated under reduced pressure for removal of all volatile matter. In this way, two products were obtained, one solid and another liquid compound. According to the analysis, the liquid compound corresponded to the formula

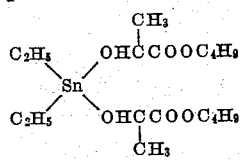

Sn content calculated 25.4%; found 24.73%.
Specific gravity at 20° C.=1.2041
Refractive index at 20° C.=1.4652

Example 22

23.9 g. (0.1 mol) of diethyl tin dimethoxide and 21.6 g. (0.2 mol) of benzyl alcohol were heated under dry nitrogen. Methanol started distilling over at 80° C., and the temperature was raised to 130° C. and heating was continued until the theoretical amount of 6.4 g. methanol was obtained.

The liquid end product was a compound of the formula

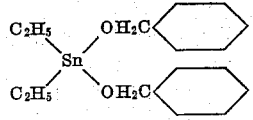

Sn calculated: 30.35%; found: 30.50%.

Example 23

33.5 g. (0.1 mol) of diphenyl tin dimethoxide and 19.6 g. (0.2 mol) of freshly distilled furfuryl alcohol were mixed and slowly heated under stirring under a stream of dry nitrogen to 120° C. until nearly the theoretical amount of methanol was distilled out (6.3 g. of methanol; calculated 6.4 g.). The residue was a yellowish sticky paste and corresponded to a diphenyl tin di-(furfuryl alcoholate) of the formula

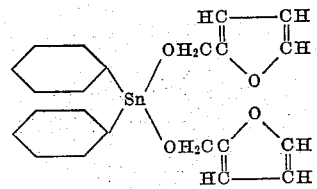

It is to be noted that the heating times and temperatures given in the examples are only by way of illustration and the heating times and temperatures required to obtain the desired end products by splitting off methanol will vary in accordance with both the organic radicals of the organo-tin methoxide and the character of the active hydrogen-containing compound. Where the reaction is slow in starting, small amounts of suitable catalysts, e. g. sodium or potassium alcoholate, sodium hydride, sodium amide may be added.

We prefer to use organo-tin methoxides as this makes it possible to carry out the new process at relatively low temperatures. In cases where both the components of the reaction and the end products are stable at higher temperatures, the organo-tin methoxide may be replaced by an organo-tin alkoxide of a lower alcohol, for instance by dialkyl or diaryl tin diethoxide or trialkyl or triaryl tin ethoxide, or even by the corresponding propoxides.

The new organo-tin compounds made available by the described method may be used, for instance, as stabilizers for vinyl resins, as additives to lubricants, and as intermediates for the preparation of other organo-tin compounds.

What we claim is:

1. A method of preparing monomeric organo-substituted stannane derivatives comprising reacting an organo-tin methoxide of the formula $$R_xSn(OCH_3)_y$$

wherein R is a monovalent hydrocarbon radical, $x+y=4$ and $x$ an integer from 2 to 3, under anhydrous conditions with an organic compound containing an active hydrogen and distilling off the methanol formed during the reaction.

2. A method as defined in claim 1 wherein an active hydrogen-containing organic compound is employed, the active hydrogen of which is bound to an oxygen atom.

3. A method as defined in claim 1 wherein an active hydrogen-containing organic compound is employed, the active hydrogen of which is bound to a sulphur atom.

4. A method as defined in claim 1 wherein an active hydrogen-containing organic compound is employed, the active hydrogen of which is bound to a nitrogen atom.

5. A method as defined in claim 1 wherein the organic compound contains a methylene group activated by two neighboring negative groups.

6. A method as defined in claim 1 wherein an active hydrogen-containing organic compound is employed which carries active hydrogen bound to a C atom of which the three other valences are linked to negative groups.

7. A method as defined in claim 2 wherein an alcohol containing more than 10 C atoms is employed.

8. A method as defined in claim 2 wherein an ether alcohol is employed.

9. A method as defined in claim 2 wherein an acetal of a trihydric alcohol having one free hydroxyl group is employed.

10. A method as defined in claim 2 wherein an ester of a hydroxyacetic acid is employed.

11. A method as defined in claim 2 wherein an oxime is employed.

12. A method as defined in claim 4 wherein an amide is employed.

13. A method as defined in claim 5 wherein a malonic ester is employed.

14. A method as defined in claim 5 wherein a beta-keto ester is employed.

15. A method as defined in claim 5 wherein a 1.3 diketone is employed.

16. A method as defined in claim 5 wherein a hydrocarbon having a conjugated double bond system is employed.

17. A method as defined in claim 1 wherein dibutyl tin dimethoxide is employed.

18. A method as defined in claim 1 wherein tributyl tin methoxide is employed.

19. A method of preparing monomeric derivatives of organo-substituted stannanes comprising the steps of reacting under anhydrous conditions an organic compound containing hydrogen replaceable by sodium with an organo-tin alcoholate of the formula $$R'_mR^2_nSn(OR)_{4-(m+n)}$$

wherein R' and $R^2$ are monovalent hydrocarbon radicals and R is an alkyl radical containing not more than 3 C atoms, and wherein $m+n$ is an integer from 2 to 3 and $m$ and $n$ are integers from 0 to 3, and heating the reaction mixture to a temperature sufficient to distill off the alcohol formed during the reaction.

20. A method as claimed in claim 19 wherein the reaction is carried out under dry nitrogen.

21. A method of preparing monomeric organo-substituted stannanediol ether esters which consists in reacting under anhydrous conditions a dicarboxylic acid with an organo-tin alcoholate of the formula $$R'_mR^2_nSn(OR)_{4-(m+n)}$$

wherein R' and $R^2$ are monovalent hydrocarbon radicals and R is an alkyl radical containing not more than 3 C atoms, and wherein $m+n$ is an integer from 2 to 3 and $m$ and $n$ are integers from 0 to 3, and heating the reaction mixture to a temperature sufficient to distill off the alcohol formed during the reaction.

22. A method of preparing monomeric organo-substituted stannanediol ether esters which consists in heating the anhydride of a dicarboxylic acid with an organo-tin alcoholate of the formula $$R'_mR^2_nSn(OR)_{4-(m+n)}$$

in the presence of small amounts of a compound containing a free hydroxyl group, where in said formula R' and $R^2$ are monovalent hydrocarbon radicals, OR is the residue of an alcohol, $m+n$ is an integer from 2 to 3 and $m$ and $n$ are each integers from 0 to 3.

23. A method of preparing monomeric hydrocarbon tin alcoholates of alcohols having more than 4 C atoms, comprising the steps of reacting under anhydrous conditions an organic compound containing hydrogen replaceable by sodium with an organo-tin alcoholate of the formula $$R'_mR^2_nSn(OR)_{4-(m+n)}$$

wherein $R^1$ and $R^2$ are monovalent hydrocarbon radicals and R is an alkyl radical containing not more than 3 C atoms, and wherein $m+n$ is an integer from 2 to 3 and $m$ and $n$ are integers from 0 to 3, and heating the reaction mixture to a temperature sufficient to distill off the lower alcohol split off during the reaction.

24. A method of preparing organo-tin alcoholates comprising reacting an organo-tin methoxide of the formula $$R_xSn(OCH_3)_y$$

wherein R is a monovalent hydrocarbon radical, $x+y=4$ and $x$ an integer from 2 to 3, under anhydrous conditions with an organic compound containing alcoholic hydroxyl groups and distilling off the methanol formed during the reaction.

References Cited in the file of this patent

UNITED STATES PATENTS

| | | |
|---|---|---|
| 2,258,718 | Rothrock | Oct. 14, 1941 |
| 2,344,002 | Rugeley et al. | Mar. 14, 1944 |